Oct. 7, 1969

P. R. EKLUND ET AL 3,470,720

METHOD OF MAKING HOLLOW BALLS FOR USE IN BALL BEARING
AND/OR SIMILAR ROLLING OPERATIONS

Filed Sept. 1, 1967

INVENTORS
PHILLIP R. EKLUND
GABEL CAMPBELL

BY

Charles H. Wagner
ATTORNEY

Oct. 7, 1969   P. R. EKLUND ETAL   3,470,720
METHOD OF MAKING HOLLOW BALLS FOR USE IN BALL BEARING
AND/OR SIMILAR ROLLING OPERATIONS
Filed Sept. 1, 1967   2 Sheets-Sheet INVENTORS
PHILLIP R. EKLUND
GABE L. CAMPBELL
BY
Charles H. Wagner
ATTORNEY

United States Patent Office 3,470,720
Patented Oct. 7, 1969

3,470,720
METHOD OF MAKING HOLLOW BALLS FOR USE IN BALL BEARING AND/OR SIMILAR ROLLING OPERATIONS
Phillip R. Eklund, Lima, Ohio, and Gabe L. Campbell, Greenville, Ohio 45331
Filed Sept. 1, 1967, Ser. No. 665,689
Int. Cl. B21b 27/10; B21d 1/02, 3/08
U.S. Cl. 72—69                                    4 Claims

ABSTRACT OF THE DISCLOSURE

A method for making hollow balls for use in ball bearings which consists in taking a section of deformable tubing of predetermined length, thickness, and diameter and positioning it between spaced opposed spherically concave rotating dies; spinning the dies while moving the dies toward each other against the tubing to deform the tubing uniformly into a hollow spherical shape body conforming to the spherical concave surfaces of the dies with the initial end openings of the tubing diametrically opposite each other; uniformly machining out the end openings of the expanded hollow spherical body to form identical inwardly tapered openings at the opposite sides thereof, inserting and securing identical tapered plugs to equal depths in said openings; then finishing the exterior of the hollow spherical body and plugs uniformly to a desired spherical uniform size to form hollow balls of predetermined size and uniform balance.

BACKGROUND OF THE INVENTION

The invention relates to the art of making balls for ball bearings and the like, and more particularly to the manufacture of hollow metallic balls, especially medium and large size balls.

One previously proposed method is to make hollow balls by initially forming two substantially hemispherical hollow shells and a radial center flanged "centering" ring or band which is interposed between the shells to center them, after which the peripheries of the shells are brazed or welded to the ring with the radial center flange projecting outwardly therebetween. The flange is then cut off, machined or grounded flush with the outer surface of the shells to provide a hollow spherical or ball like body, with a "girth weld."

Another proposed method involves the use of opposed dies having identical hemispherical cavities facing each other in which a solid slug of metal is inserted between the dies and the dies forced together to deform the slug into a solid spherical shape conforming to the spherical cavity formed between the two dies when they are forced together.

Still another proposed method for making solid spherical bodies is to utilize a stationary and rolling die arrangement in which a solid metal slug is dropped into or between the dies at an initial receiving point. An elongated die cavity of changing shape which is formed in one of the dies gradually squeezes or deforms the slug into a spherical shape as the dies are relatively moved over each other, somewhat like dies for rolling screw threads on a deformable cylindrical metal blank. These latter two proposed methods cannot form a hollow ball shaped body. The first mentioned proposed method utilizes a "girth" weld which is not entirely satisfactory for the production of balls for ball bearings which are resistant to heavy loads or maximum crushing forces, or are homogeneous and have a maximum rolling balance.

SUMMARY OF THE INVENTION

Tests have shown that a hollow ball having an optimum wall thickness with respect to its outside diameter will provide a load carrying capacity substantially equal to that of a solid ball, and with a relatively great decrease in weight. An object of the invention therefore is the method of making and processing such hollow balls, suitable for ball bearings and the like, which method is practicable, simple, and inexpensive, and provides reasonably comparable balance and strength to conventional solid balls, in which excessive weight and extensive finishing is not required.

The load carrying capacity of the previously proposed two piece welded together hollow ball bearings is greatly limited by the strength of the "weld joint" at the equator, or great circle, also referred to as the "girth" weld, also the "rolling" balance is or may be greatly affected.

It is a further object of the invention to completely eliminate this "girth weld," as well as to provide a hollow ball which has greater crushing strength and balance, and less weight.

In order to assure a good weld penetration throughout the wall thickness in the "girth" welded balls a certain amount of "flash" is necessary on the opposite sides of the joint during the welding procedure, and the wall is weakest at this welded joint between the two hemispherical shells. This flash will also be present on the inside surface of the ball and is incapable of being reached for removal or smoothing. This can materially effect the static balance of these proposed hollow balls. Even though it is highly desirable that this internal "flash" be of uniform dimensions and uniformly distributed to prevent any ball unbalance during operation, especially in large size, fairly high speed ball bearings this was not previously possible.

Applicants utilize aligned opposed rotating dies with hemispherical die surfaces facing each other and a short length of deformable metal tubing is placed between the two spinning dies with its ends centered in the hemispherical die cavities. The spinning dies are forced toward each other against the ends of the tubing to spin or deform the tubing outward against the inner surfaces of the hemispherical cavities as the dies are brought together, to conform to the spherical shape but leaving the initial openings in the ends of the deformable tubing at opposite sides of the spherical body that is formed. These openings are finished such as by reaming to provide identical, diametrically opposite, inwardly tapered openings into which tapered identical plugs are inserted and secured at equal depths in these tapered recesses with the stubs from the plugs projecting outwardly. These stubs are then removed substantially flush with the exterior surface of the spherical body thus formed. The outer surface can then be finished conventionally to provide a hollow ball of desired size, weight, and balance, which is light, strong, and satisfactory for ball bearing construction.

BRIEF DESCRIPTION OF THE PREFERRED EMBODIMENTS

Figure 1:
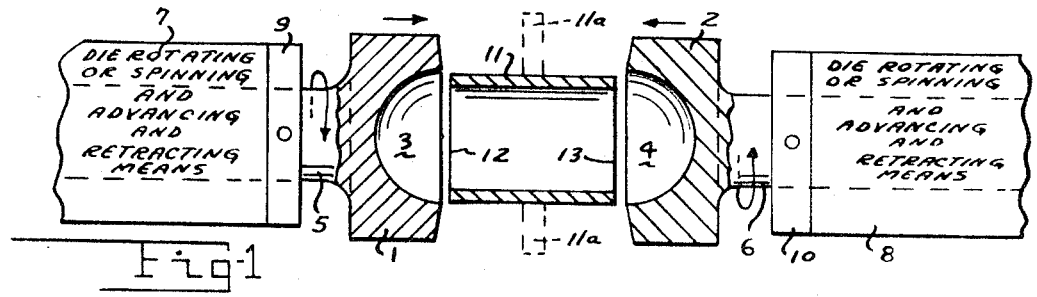
FIGURE 1 is a somewhat schematic sectional view illustrating the aligned spinning hemispherical die members separated with the deformable section of tubing positioned therebetween.

In the apparatus for carrying out the method, as shown in the drawings, the reference numerals 1 and 2 denote two opposed die members which are formed with hemispherical cavities 3 and 4 facing each other.

Figure 2:
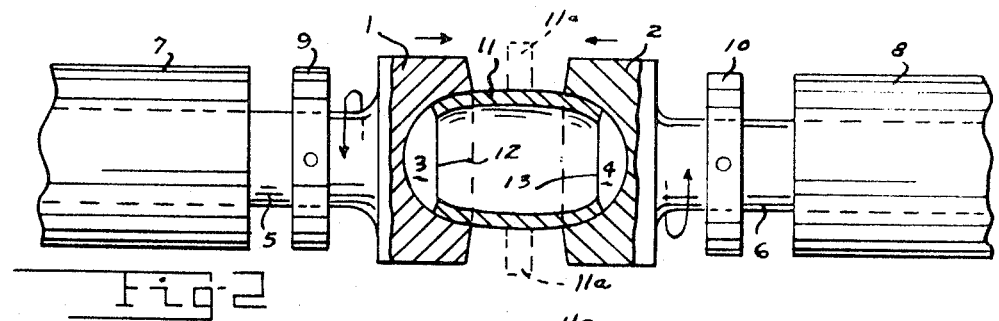
FIGURE 2 is a schematic sectional view similar to FIGURE 1, but illustrating the spinning die members being moved toward each other to engage the opposite ends of the tubing and partially deforming or changing the shape thereof.
Figure 3:
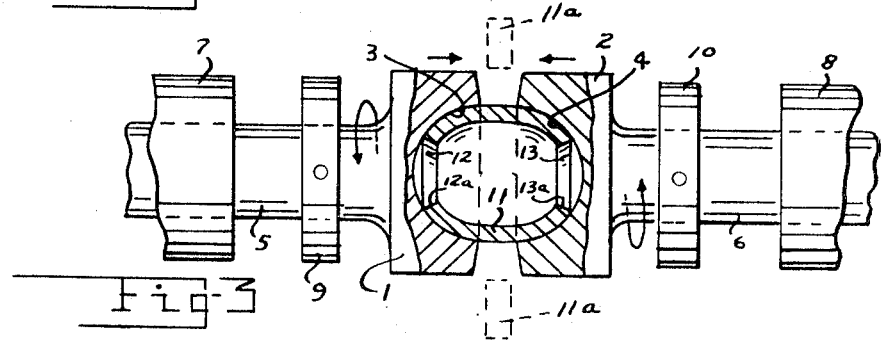
FIGURE 3 is a view similar to FIGURES 1 and 2, but with the inserted tubing further deformed toward the desired spherical shape by the closing spherical dies.
Figures 4, 5:
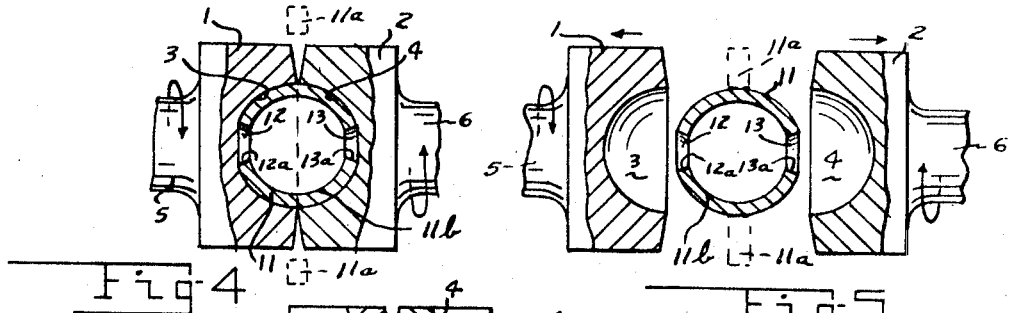
FIGURE 4 shows the spinning dies brought together to provide the spherical die cavity with the shape of inserted tubing deformed thereby into the spherical shape conforming to the interior of the two die cavities, and with the initially open ends of the tubing opposite each other in substantially concentric relation to the rotative axis of the aligned die members.
FIGURE 5 is a similar view, but with the die members retracted away from each other to release the hollow spherical body that was formed from the cylindrical hollow length of tubing shown in FIGURE 1.
Figure 6:
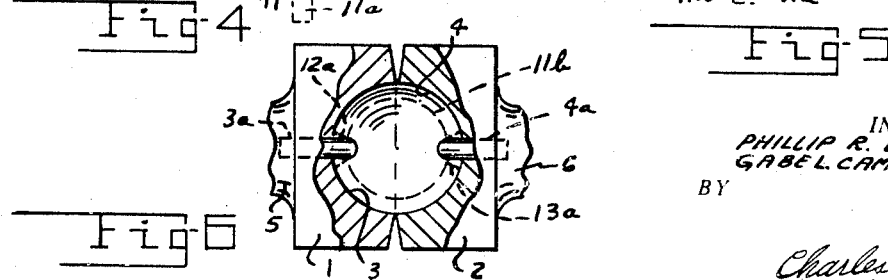
FIGURE 6 is a fragmentary view, partly in elevation and partly in section, with the spherical body that was formed thereby shown in dotted lines, showing a slight modification in which projecting centering pins are provided having the approximate diameter or size of the end opening in the opposite sides of hollow spherical body to maintain the openings in substantially concentric relation to the axis of the rotating dies during the formation of the spherical body from the short open ended length of the tubing that is shown in FIGURE 1.
Figure 7:
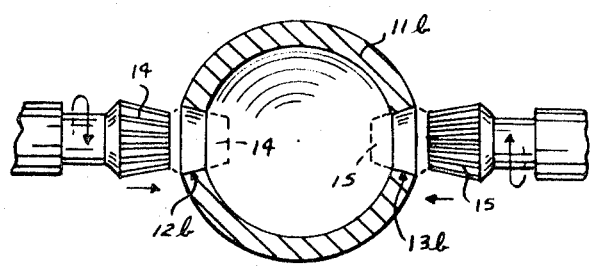
FIGURE 7 is an enlarged fragmentary, sectional view illustrating the opposite openings left in the spherically formed body being reamed out to form identical inwardly tapered plug receiving openings in the spherical hollow body, dotted lines showing the reaming members advanced equally into the openings at opposite sides of the spherical body.

The die members 1 and 2 are centrally mounted on aligned, rotatable and longitudinally shiftable shaft members 5 and 6 which are carried in suitable supporting and bearing members 7 and 8 respectively. The shaft members 5 and 6 may have suitable stop collars 9 and 10 fixed thereon to limit the separation of the die members 1 and 2 when they are retracted away from each other to position a short length of a deformable cylindrical tube member of predetermined diameter, a length and wall thickness therebetween as indicated at 11, that is to be shaped or spun into a spherical or ball shape against the inner surfaces of the spinning dies as they are forced toward each other, as progressively illustrated in FIGURES 2 to 4. The deformable tubular member 11 may be initially positioned between the two hemispherical cavities 3 and 4 in the dies 1 and 2 by any suitable supporting removable means indicated at 11a which of course must be withdrawn out of the way of, or just before the dies 1 and 2 are finally moved together, as seen in FIGURES 3 and 4. The axis of the deformable tubing can thus be retained in concentric relation to the axis of the spinning dies, with the open ends 12 and 13 of the tubing 11 facing the centers of the spherical cavities 3 and 4 and concentric thereto, also it may provide means to retard or prevent rotation of the tubing 11 during the contact thereof with the spinning dies 1 and 2.

The supporting and bearing members 7 and 8 preferably include suitable conventional or well known means for rotating or spinning the shafts 5 and 6 to spin the dies in opposite directions about their axis and advancing the rotating dies toward each other while into deforming or spinning engagement with the opposite ends of the tubing 11 to spin or deform the same to the spherical shape conforming to the inner spherical surface of the combined cavities 3 and 4 as the dies are forced together, and also include means for retracting the dies away from each other to release the spherical hollow body thus formed, as seen and denoted at 11b in FIGURE 5. It is contemplated that the supporting means 11a may be connected so as to engage and support the spherical member thus formed, and indicated at 11b in FIGURES 4 to 10.

It is also contemplated that the tubing 11 may be heated initially to a suitable temperature for satisfactory deforming or spinning before it is positioned between the dies 1 and 2, as seen in FIGURE 1.

If so desired, each of the hemispherical cavities 3 and 4 may be provided with a concentric inwardly projecting pin or post 3a and 4a having a predetermined diameter slightly smaller than the opposite openings 12a and 13a that remain in the spherical body 11b thus formed, these being provided to keep the opening 12a and 13a, in the body 11b concentric to the rotating axis of the dies.

Figure 8:
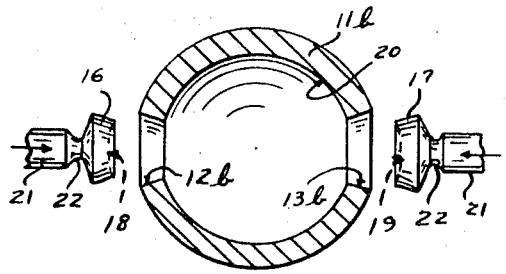
FIGURE 8 is a similar schematic sectional view, after the reamers have been removed and identical tapered plug members are disposed for insertion into the reamed openings, in which the plugs have inner and outer surfaces substantially conforming in curvature to the inner and outer surfaces of the spherically formed hollow body.

Referring to FIGURES 7 to 10 the opposite openings 12a and 13a remaining in the spherical hollow body 11b are then uniformly machined or reamed out, for instance by suitable tapered reamers 14 and 15 to form identical inwardly tapered plug receiving openings 12b and 13b at the opposite sides of the body 11b, as shown in FIGURE 8.

Figure 9:
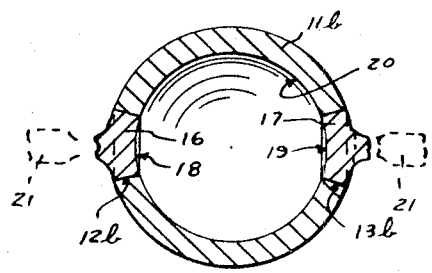
FIGURE 9 illustrates the identical tapered plugs equally forced into the tapered reamed openings in the spherical body, and the "actuating" stems broken or severed (as seen in dotted lines) off next to the exterior surface of the spherical body.
Figure 10:
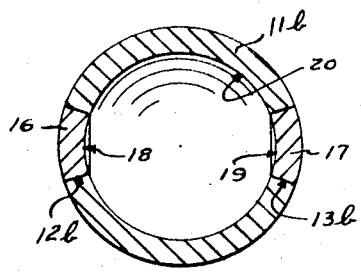
FIGURE 10 illustrates the final step in which the outer surfaces of the ball and plugs are smoothed and finished by any conventional well known means, to the desired size or diameter, or wall thickness.

Similarly tapered identical plug members 16 and 17 are provided which are pressed into and secured in the openings 12b and 13b at equal depths, as seen in FIGURE 9. The front surfaces of plugs preferably have a spherical curvature 18 and 19 conforming to the inner spherical surface 20 of the spherically formed hollow body 11b. The outer or back curvature of the plugs 16 and 17 preferably may have a curvature similar to the outer surface curvature of the body 11b, each plug being provided with a central stem 21 connected to the back by a reduced or "break" area 22. After the plugs are forced and secured (at equal depths) in the openings 12b and 13b the stems 21 are then severed from the plugs as seen in FIGURE 9.

The spherical body 11b and the outer surfaces of the plugs 16 and 17 are then finished "flush" to a true spherical shape of predetermined and desired diameter (and hardness) in the conventional manner, thus a method for making hollow homogeneous spherical balls of satisfactory crushing strength, balance, hardness and weight, suitable for ball bearings, particularly of the medium and larger sizes.

For purposes of exemplification, a particular embodiment of the invention has been shown and described to the best understanding thereof. However, it will be apparent that minor changes and modifications in the exact arrangement and construction of the parts may be resorted to without departing from the true spirit and scope of the invention as defined in the accompanying claims.

I claim:
1. The method of making hollow spherical bodies, such as hollow balls for ball bearings which comprises separating two opposing die members rotatable on on a common axis and each having hemispherical die cavities formed therein facing each other, positioning a deformable cylindrical tubular member of predetermined diameter, length and wall thickness between the spaced apart hemispherical cavities with the axis thereof substantially coincident with the rotating axis of the die members, spinning the die members in opposite directions on said axis while moving the die members relatively toward each other to move the surfaces of said hemispherical cavities into impinging and deforming contact with the opposite ends of said cylindrical tubular member to deform the same inwardly into initimate surface contact with both hemispherical surfaces of the cavities as the rotating die members are moved together, to deform said tubular member into a hollow spherical body conforming to the spherical cavity formed by said two hemispherical cavities as said two die members are forced together, with the initial openings at the opposite ends of the deformed tubular member disposed substantially opposite each other, separating the two die members sufficiently to remove therefrom the hollow spherical body formed thereby, removing the hollow spherical body from between the separated die members, reaming out said opposite initial openings of the tubular members to identical depths, with reamer means having a predetermined taper, to form identical inwardly tapered openings in the opposite sides of the hollow spherical body, securing identically tapered plug members in said tapered reamed openings to close said openings, finishing the exterior of said plug members to a spherical curvature contiguous with the spherical curvature of the hollow spherical body, to form a hollow spherical body having a complete and uniform spherical exterior surface.

2. The method as claimed in claim 1 which includes the step of heating the cylindrical tubing which has a diameter approaching the diameter of the hemispherical cavities, to a deformable temperature and supporting the tubing concentrically on the spinning axis of the two dies throughout a material portion of the closing movement of the die members to retain the tubing in a substantially fixed position during a major portion of the spinning deformation of the opposite ends of the outer surface of the tubing against the hemispherical surfaces of the die members.

3. A method as set forth in claim 2 which includes securing plug members in the tapered opening formed in the opposite sides of the spherically formed hollow body which have a thickness equal to the thickness of the wall of the spherically formed hollow body and having inside concave and outside convex spherically curved surfaces having respectively the same curvatures as the inside and outside curvatures of the spherically formed body.

4. A hollow spherical body having a pair of similar inwardly tapered diametrically opposite tapered circular plug receiving openings through the wall thereof, and similarly circular tapered plug members fitted and secured in said openings, each having a thickness substantially equal to the wall thicknes of the spherical body, and outer and inner spherical curvatures identical to the spherical curvatures of the inner and outer surfaces of said spherical body.

References Cited

UNITED STATES PATENTS

| 1,039,673 | 9/1912 | Schatz | 29—148.4 |
| 1,526,140 | 2/1925 | Gruver | 29—148.4 |
| 2,848,804 | 8/1958 | Graves et al. | 72—112 |

FOREIGN PATENTS 726,100  5/1932  France.

CHARLES W. LANHAM, Primary Examiner

LOWELL A. LARSON, Assistant Examiner

U.S. Cl. X.R.

29—148.4; 72—112